United States Patent
Van Huis

[15] 3,702,109

[45] Nov. 7, 1972

[54] ANIMAL CAGE CONSTRUCTION AND METHOD FOR CONSTRUCTION PANEL THEREFORE

[72] Inventor: Robert L. Van Huis, Zeeland, Mich.

[73] Assignee: Big Dutchman, Inc., Zeeland, Mich.

[22] Filed: July 28, 1971

[21] Appl. No.: 166,876

[52] U.S. Cl. .................................119/17, 119/48
[51] Int. Cl. ..........................................A01k 31/06
[58] Field of Search.................119/17, 18, 45, 48

[56] References Cited

UNITED STATES PATENTS 3,338,214    8/1967    Pockman....................119/48

*Primary Examiner*—Aldrich F. Medbery
*Attorney*—Price, Heneveld, Huizenga & Cooper

[57] ABSTRACT

An animal cage construction having a plurality of sides forming an enclosure. At least some of the sides are constructed of a wire fabric having at least one terminal edge inclined at angles to the direction in which the wires forming the fabric extend. The terminal edge is formed by predetermined ones of the wires being crimped to give the desired shape of the terminal edge.

11 Claims, 4 Drawing Figures

PATENTED NOV 7 1972 3,702,109

ANIMAL CAGE CONSTRUCTION AND METHOD FOR CONSTRUCTION PANEL THEREFORE

BACKGROUND OF INVENTION

This invention relates to animal cages, and more particularly, to poultry cages utilized for egg laying hens.

In conventional egg laying poultry cages, the cages are interconnected in tandem fashion and fully enclosed by a bottom, top, front, back and sides formed of wire fabric which is constructed of a plurality of parallel and perpendicularly intersecting wires. For strength, each wire is welded together at their points of traverse. Generally, an egg tray or trough is positioned along the lower front edge of the cages and the bottoms of the cages are inclined so that when an egg is layed, its gravitational weight urges it down the inclined bottom into the tray. Thus, each cage in vertical cross-section is essentially trapezoidal in shape, and as result, the bottom terminal edge of the side panels of each cage are inclined to match the slope of the bottom of the cage. Thus, the side panels of each cage are also trapezoidal in shape, and beginning with the bottom horizontal wire in each end wall, one or more are non-parallel with the adjacent wire and hence not horizontal.

Although some cages are constructed of custom-made side panels, it is uneconomical to make such side panels which at their inception have a non-rectilinear shape. Rather, the conventional way to mass produce these cages is to cut all components out of mass produced sheets or rolls of wire fabric of a desired width depending on the size and shape of the cages. Under existing conventional ways, in order to achieve the trapezoidal shape for the side panels, the wire fabric of a width determined by the height of the front of the cage or the depth of the cage is simply cut at the requisite angle desired leaving loose ends of wire which are cut back to the next welded intersection of wires. This construction leaves substantial gaps between welded intersections of wires to which the bottom panel of the cage can be secured thus weakening the entire structure. A bottom wire may then be welded to each of the remaining intersections. Alternatively, the bottom wire is joined by wrapping the loose distended wires there around. In either instance this takes additional time, labor and hence money.

SUMMARY OF THE INVENTION

In accordance with this invention, a cage is constructed so as to eliminate the disadvantages of the two constructions previously referred to. This invention permits the use of mass-produced sheets or rolls of wire fabric while at the same time providing a side panel having a lowermost marginal edge constructed so that the bottom panel can be secured thereto at closely spaced intervals.

The side panel proposed by this invention to be used in the cage is formed from a standard piece of wire fabric having horizontal and vertical components rigidly interconnected at their intersections. Selected ones of the vertical wires are crimped between the horizontal wires to form the desired shape of the panel. Specifically, the vertical wires from front to back are progressively crimped more and more to give the desired slope to the lower marginal edge of the side panel. This provides a poultry cage which can be constructed of standard wire fabric and at the same time permits the bottom panel of the cage to be secured at the welded intersection of each of the vertical wires to the lowermost horizontal wire.

The preformed wire fabric panel provided by this invention is quick and easy to shape as compared to forming the panel by initially orientating the wires before welding. The panel also permits the securing of the bottom panel to the side panel at a substantially greater number of points thus permitting the use of lesser gage wires for the bottom panel. This cage construction also produces a substantially stronger and rigid cage than heretofore has been possible with standard wire fabric.

DESCRIPTION OF THE PREFERRED EMBODIMENT

The following description pertains specifically to an egg laying cage. However, it should be appreciated that the side panel utilized therein and the method for making it may have many and varied applications.

Figure 3:
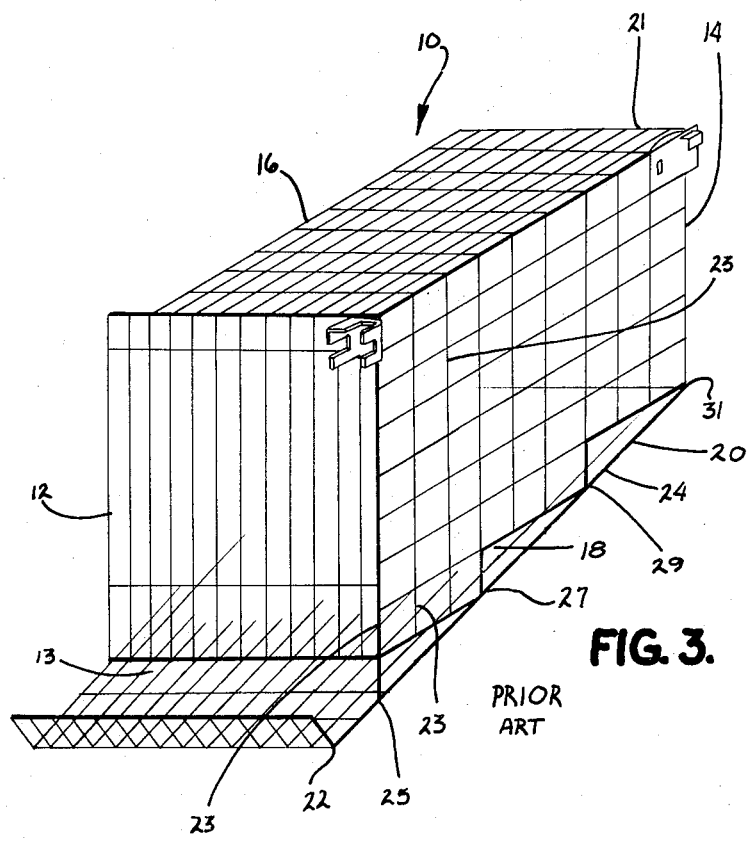
FIG. 3 is a perspective view of a poultry cage having side panels fabricated according to the teachings of the prior art shown in FIG. 1.

Referring now to the drawings in detail, FIG. 3 shows a conventional poultry cage 10 well known to the prior art comprised of a front panel 12, back panel 14, top panel 16, bottom panel 18 and side panels 20. Each panel identified is generally comprised of a plurality of first parallel wires 21 (FIG. 1 running in one direction and a plurality of second parallel wires 23 running in a direction perpendicular to the first parallel wires. The wires are anchored or welded to each other at each point of intersection. Except for the side walls 20, each panel is rectangular. Bottom panel 18 is inclined so that when an egg is layed by a hen, the egg will roll down the incline to the front of the cage into an egg receiving trough 22 to permit easy removal thereof. A spacing 13 between front panel 12 and bottom panel 18 allows the egg to roll freely into the tray. As a result of the inclined orientation of bottom panel 18, side panels 20 should be generally trapezoidal in shape with the lower terminal edge 24 being sloped to conform to the incline of the bottom.

Figure 1:
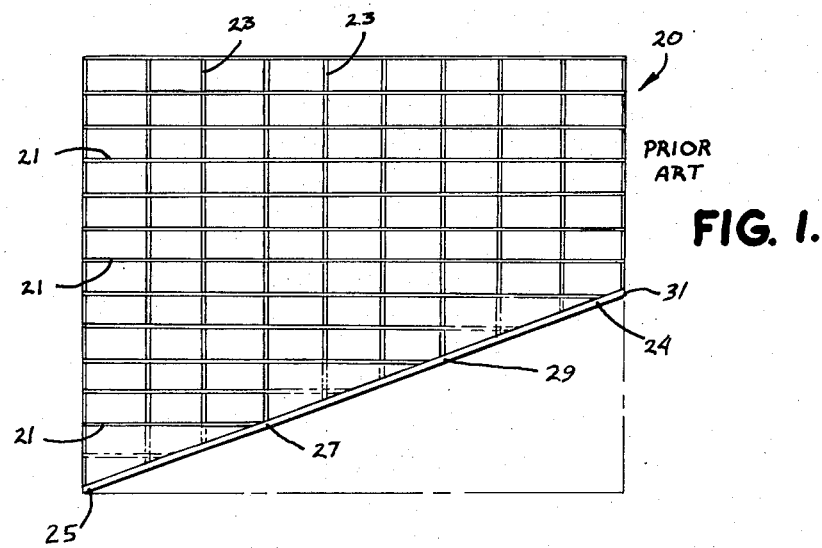
FIG. 1 is an elevation view of a panel of wire fabric which has been cut and welded according to the teachings of the prior art.

According to the prior art which is shown in both FIGS. 1 and 3, the side panels 20 are made by taking a rectangular piece of woven wire fabric as shown in FIG. 1 (a portion of which is shown in phantom) and cutting it along the bias line 24, the slope of which corresponds to the incline of bottom panel 18. The free ends of the wires 23 (in phantom) which do not extend to the marginal edge are then cut off at the nearest horizontal wire 21. It will be appreciated that with this construction, the bottom panel 18 of the cage (FIG. 3) can be secured to the side panel at only the intersecting points 25, 27, 29 and 31 which greatly reduces the strength of the entire cage and requires bottom panels of greater gauge. Therefore, a primary object of this invention is to form the side panels into the desired shape with the elimination of any cutting of the wires along the bias or diagonal.

Figure 2:
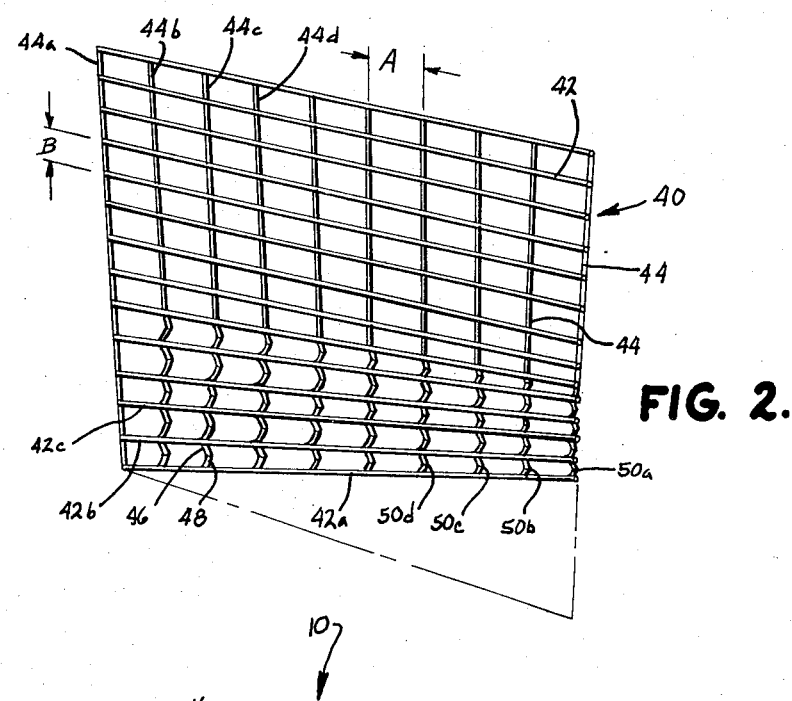
FIG. 2 is an elevation view of a panel of wire fabric shaped according to this invention.
Figure 4:
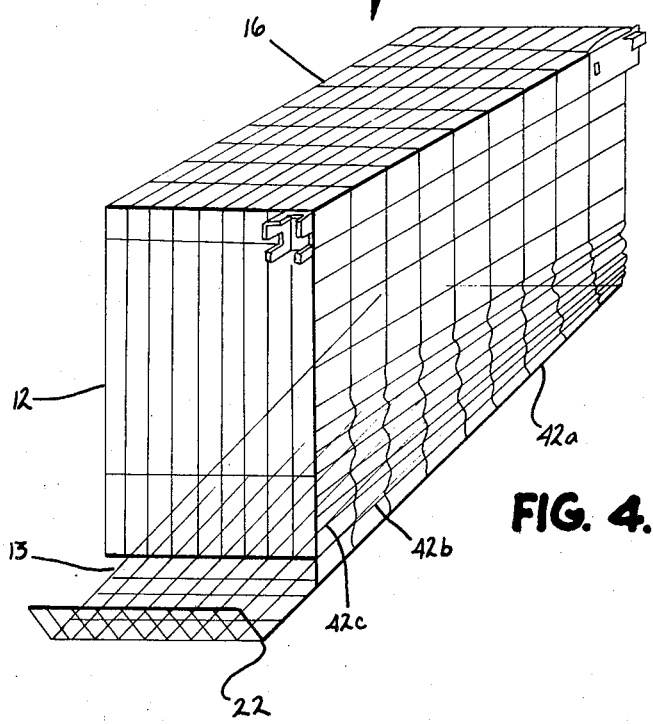
FIG. 4 is a perspective view of a poultry cage having side panels shaped according to this invention.

Referring now to FIGS. 2 and 4 in detail, FIG. 2 shows a panel or section of wire fabric 40 shaped according to this invention. Initially, the panels are comprised of a plurality of horizontal and vertically spaced wires 42 and 44 mass produced in sheets or rolls similar to the prior art described above. Dimensionally, the spacing is not extremely critical except for the bottom panel of the cage which acts as an egg rolling surface inclined to permit the egg to roll into egg receiving trough 22. Conventionally, the bottom panel wire spacings are ½ inch by 2 inch or 1 inch by 2 inch, the longer dimension relating to the sloped wires of the bottom panel. Recent discoverys in bottom panel configurations are disclosed in an earlier filed application by Willis R. Voran, Ser. No. 824,767, Filed May 15, 1969, which application shares a common assignee with the instant application. There it is disclosed that a horizontal spacing of ¾ inch permits the least damage to eggs at the least incline or slope of the bottom panel. Thus, the spacings, "A" and "B" preferably correspond to that of the bottom panel so that the entire cage is constructed of similar wire fabric panels. Also, the overall configuration of the cage is then uniform.

The initial overall rectangular configuration of panel 40 (FIG. 2) is shown by the portions extended in phantom. Each traversing wire 42 and 44 is rigidly interconnected, for example by welding. Thus, prior to the shaping operation, each side panel is of a rigid one piece configuration. In order to shape the panel so that the lowermost marginal edge wire 42a is at a preselected incline to match the incline of bottom panel 18 (FIG. 4), selected portions of the vertical wires are crimped between the horizontal wires to form the desired shape of the side panel. The effect of each crimp in a particular wire is to shorten the overall length of that wire. Thus, by varying the magnitude of crimping in adjacent vertical wires each vertical wire is foreshortened in varying amounts so that the bottom marginal wire 42a defines a uniform slope.

Preferably, the marginal vertical wire 44a which is attached to front panel 12 is not crimped. This permits easy interconnection to the front panel and provides a smooth appearance. Beginning with wire 44b adjacent marginal wire 44a, each vertical wire 44c, 44d etc. from front to back are progressively crimped in increasing magnitude to give the desired slope to the lower marginal edge wire 42a of the side panel. Depending on the degree of slope, each vertical wire includes a plurality of spaced crimped portions, each of which is intermediate to adjacent horizontal wires beginning with the bottom two wires 42a and 42b. As shown in FIG. 2, only the lower portions of the vertical wires are crimped in the embodiment shown. The magnitude and number of crimps depends mainly on the overall configuration sought in relation to the size of the panel keeping in mind that one objective is an eye appealing panel which does not look violently deformed.

Since the horizontal wires 42 are rigidly interconnected to each vertical wire, the shortening of any particular vertical wire will cause the horizontal wires attached thereto to become gathered inward into a closer proximity to the next adjacent horizontal wire. Thus, for example, the spacing between horizontal wires 42a and 42b is reduced at each point wherein the vertical wire therebetween is crimped. The magnitude or degree of each particular crimp, if controlled in a uniform varied fashion will provide a smooth reduction in the spacing between two particular horizontal wires such as 42a, 42b, 42c etc. so that the horizontal wires remain essentially horizontal although they do become non-parallel with respect to each other. Thus, referring to FIGS. 2 and 4, the spacing between wires 42a and 42b at the rear end of cage 10 is less than the spacing between these wires at the front end of the cage in order to obtain the slope desired. As a result thereof, the crimped portions 50a, 50b, 50d etc. vary respectively in decreasing magnitudes.

An important advantage provided by the shaping of a panel according to this invention is the elimination of having to cut any of the component wires or weld the marginal edge. Also, all of the vertical wires 44 contribute to the support of the horizontal wires and hence a lesser gage wire can be utilized over prior constructions which cut the subtended wires 23 as shown in FIG. 1. The smaller the wire thickness of course, the more inexpensive the costs. Like-wise the reduction in manual handling (cutting, welding etc.) the more inexpensive the costs.

METHOD OF CONSTRUCTING CAGE

In order to construct a poultry cage similar to that shown in FIG. 4, a rectangular panel of wire fabric 40 is provided having a height equal to the height of front 12 plus that of spacing 13, while its length is equal to the width of top 16. The remaining dimensions of the trapezoidal side will be defined by the height of back panel 14 and the slope of bottom panel 18. Generally, the slope of bottom 18 is less than 10° in order to prevent excessive egg breakage.

Beginning with wire 44b, each wire is crimped starting from the point intermediate wire 42b and marginal wire 42a. The magnitude of crimp as between any two horizontal wires is increased progressively from front to back so that the reduction in length of each vertical wire likewise increases from front to back. In this fashion, marginal wire 42a is sloped an amount equal to the slope of bottom panel 18. It will be appreciated that it will many times be necessary to crimp each vertical wire a plurality of times.

The remaining top, bottom, front and back panels of cage 10 are comprised of pre-cut rectangular panels connected to sides 40 in a conventional fashion.

Although but one embodiment has been shown and described in detail, it will be obvious to those having ordinary skill in this art that the details of construction of this particular embodiment may be modified in a great many ways without departing from the unique concepts presented. Hence although the preferred embodiment is a poultry cage used for egg laying hens, it is not intended to be so limited. It is therefore intended that the invention is limited only by the scope of the appended claims rather than by particular details of construction shown, except as specifically stated in the claims.

The embodiments of the invention in which an exclusive property or privilege is claimed are defined as follows:

1. An improved poultry cage comprising a front, back, top, bottom and pair of side panels joined together to form an enclosed cage, said bottom panel being inclined with respect to the side panel so that an egg layed by a hen will roll forwardly into an egg receiving trough, the improvement comprising said side panels being comprised of a plurality of generally horizontal and vertical wires interconnected to each other at their respective points of traverse, selected ones of said vertical wires being crimped intermediate one or more pairs of adjacent horizontal wires to shorten the overall length of each of said crimped vertical wires so that at least said bottom horizontal wire is gathered into closer proximity to the top horizontal wire and non-parallel with it an amount equal to the slope of said bottom panel.

2. The poultry cage according to claim 1 wherein the magnitude of crimp is progressively increased more and more from front to back to give the desired slope to the lower marginal edge of said side panel.

3. The poultry cage according to claim 2 wherein said selected ones of said vertical wires being crimped include a plurality of spaced crimped portions along the lower portions of said wires, said plurality of crimped portions defining a locus of points intermediate a plurality of pairs of adjacent horizontal wires.

4. The poultry cage according to claim 2 wherein the forward-most vertical wire defining the leading marginal edge of said side panels remains generally straight.

5. The poultry cage according to claim 2 wherein the periphery of said side panels defines a trapezoid, the non-parallel side of said panels corresponding to the slope of said bottom panels.

6. In an animal cage constructed of a plurality of panels, at least one panel being constructed of a wire fabric composed of sets of a plurality of parallel and intersecting wires, said parallel and intersecting wire sets being rigidly interconnected, said one panel having one terminal edge orientated at a desired angle by at least partially crimping predetermined wires of one set of said plurality of parallel wires.

7. The animal cage according to claim 6 wherein said cage includes a bottom panel inclined with respect to the remaining panels, said one panel being a side panel having parallel vertical wires, the lower portions of predetermined ones of said vertical wires being crimped to shorten the overall length of each said predetermined vertical wires so that at least the bottom intersecting wire defines a terminal edge orientated with respect to said vertical wires at an angle of incline equal to that of said bottom panel.

8. The animal cage according to claim 7 wherein said animal cage is a poultry cage, and said inclined bottom is adapted to urge eggs layed thereon to roll toward an egg receiving trough, said predetermined ones of said vertical wires being progressively crimped more and more from front to back so that the lower marginal edges of said side panel is inclined at an angle corresponding to that of said bottom panel.

9. The method of shaping a panel of wire fabric having an initial predetermined shape and constructed of a plurality of intersecting and rigidly interconnecting wires comprising the step of crimping one or more wires at one or more spaced portions intermediate adjacent wires connected thereto so that the length of said crimped wire is shortened, and the other wires adjacent said crimped portions are gathered into closer proximity to each other with the overall shape of said panel being controlled by the magnitude of said crimped portions.

10. The method according to claim 9 wherein said panel initially has a rectangular shape and is comprised of a plurality of horizontal and vertical spaced wires welded together at their intersections, whereby said panel is shaped into a trapezoid by crimping a portion of each vertical wire intermediate two horizontal wires, the magnitude of each crimped portion being less than the succeeding portion so that each wire is foreshortened a lesser amount than the succeeding one and the horizontal wires adjacent said crimped portions are gathered into closer proximity to each other and become non-parallel.

11. The method according to claim 10 wherein a pair of identical trapezoidal panels is formed, said panels being interconnected to a plurality of rectangular panels along each edge to form a poultry cage having a bottom panel inclined with respect to the remaining panels so that an egg layed on said bottom panel is propelled downwardly to an egg receiving trough.

* * * * *